(12) United States Patent
Mako et al.

(10) Patent No.: US 11,572,417 B2
(45) Date of Patent: Feb. 7, 2023

(54) SURFACE FUNCTIONALIZATION OF CELLULOSE AND OTHER SUBSTRATES

(71) Applicant: University of Rhode Island Board of Trustees, Kingston, RI (US)

(72) Inventors: Teresa L. Mako, Providence, RI (US); Mindy Levine, Sharon, MA (US); Jason Dwyer, Providence, RI (US)

(73) Assignee: University of Rhode Island Board of Trustees, Kingston, RI (US)

(*) Notice: Subject to any disclaimer, the term of this patent is extended or adjusted under 35 U.S.C. 154(b) by 460 days.

(21) Appl. No.: 16/870,829

(22) Filed: May 8, 2020

(65) Prior Publication Data
US 2020/0354479 A1 Nov. 12, 2020

Related U.S. Application Data

(60) Provisional application No. 62/845,040, filed on May 8, 2019.

(51) Int. Cl.
| | |
|---|---|
| *C08B 15/00* | (2006.01) |
| *G01N 21/78* | (2006.01) |
| *G01N 31/22* | (2006.01) |
| *G01N 21/25* | (2006.01) |
| *G01N 21/17* | (2006.01) |

(52) U.S. Cl.
CPC ........... *C08B 15/00* (2013.01); *G01N 21/251* (2013.01); *G01N 21/78* (2013.01); *G01N 31/227* (2013.01); *G01N 2021/1776* (2013.01)

(58) Field of Classification Search
CPC ...... C08B 15/00; C08B 15/06; G01N 21/251; G01N 21/78; G01N 31/227; G01N 2021/1776
See application file for complete search history.

(56) References Cited

U.S. PATENT DOCUMENTS

| 4,434,235 A | 2/1984 | Rabi et al. |
|---|---|---|
| 8,440,441 B2 | 5/2013 | Bluchel et al. |
| 2010/0290948 A1* | 11/2010 | Song ..................... B01L 3/5023 422/423 |

(Continued)

OTHER PUBLICATIONS

Bhakta et al, "Determination of Nitrite in Saliva using Microfluidic Paper-Based Analytical Devices" Anal Chim Acta. Jan. 27, 2014; 809: 117-122 (Year: 2014).*

(Continued)

*Primary Examiner* — Dennis White
(74) *Attorney, Agent, or Firm* — Milstein Zhang & Wu LLC; Duan Wu, Esq.

(57) ABSTRACT

The invention provides a mild procedure for the functionalization of cellulose and other substrates with a detection reagent such as N-(1-naphthyl)ethylenediamine and is able to achieve much higher functionalization density than previously reported. A paper-based device created using cellulose functionalized according to the invention allowed for much lower detection limits for nitrite in various kinds of water samples than have been seen using paper-based devices. In addition, grafting of N-(1-naphthyl)ethylenediamine to cellulose improved the stability of the N-(1-naphthyl)ethylenediamine in the presence of moisture and light.

16 Claims, 5 Drawing Sheets
(5 of 5 Drawing Sheet(s) Filed in Color)

(56) References Cited

U.S. PATENT DOCUMENTS

2013/0210111 A1     8/2013    Bluchel et al.
2015/0153286 A1*   6/2015    Kuan ...................... C12Q 1/54
                                                                              435/287.7

OTHER PUBLICATIONS

"Griess Reagent System": Instructions for Use of Product G2930, Technical Bulletin by Promega Corporation, 2009 (Madison, WI, USA).

* cited by examiner

Scheme 1

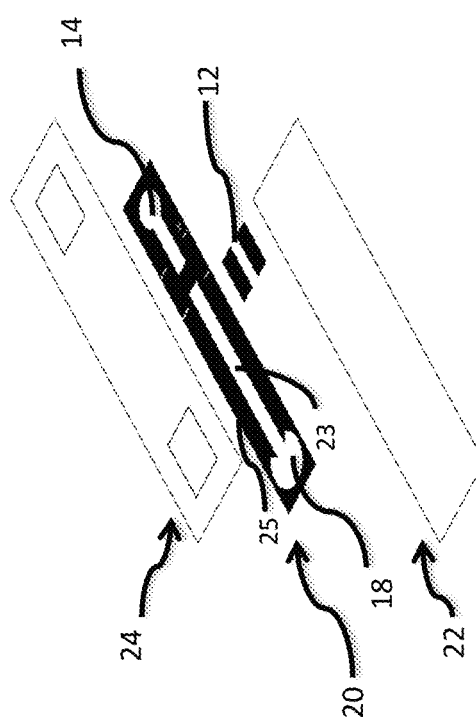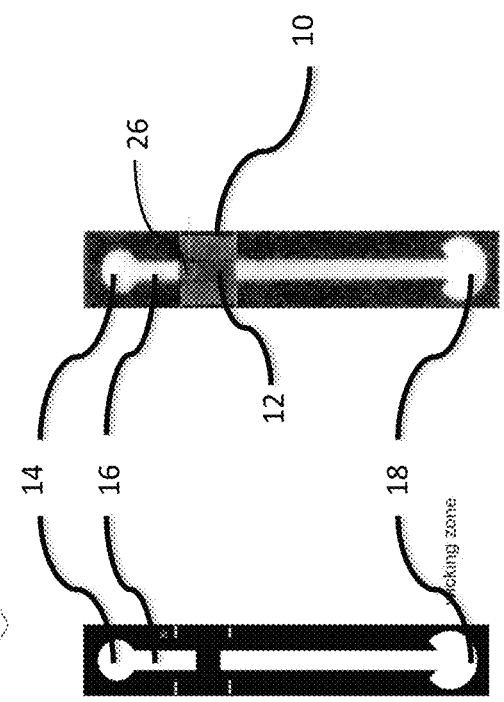

SURFACE FUNCTIONALIZATION OF CELLULOSE AND OTHER SUBSTRATES

CROSS-REFERENCE TO RELATED APPLICATIONS

This application claims priority to and the benefit of U.S. provisional patent application Ser. No. 62/845,040, filed May 8, 2019, which application is incorporated herein by reference in its entirety.

STATEMENT REGARDING FEDERALLY SPONSORED RESEARCH OR DEVELOPMENT

This invention was made with government support under 1655221 awarded by National Science Foundation. The government has certain rights in the invention.

FIELD OF THE INVENTION

The invention relates to chemical modification of a cellulose-based substrate in general and the development of ultrasensitive methods utilizing cellulose-based devices for detecting low levels of nitrite and nitrate.

BACKGROUND OF THE INVENTION

The nitrogen cycle in the ecosystem dictates how various life forms live together (see on-line, e.g., at marfapublicradio.org/blog/nature-notes/the-nitrogen-cycle). Due to the detrimental nature of nitrite ions ($NO_2^-$) to both human health (see, e.g., Ward et al. *Int. J. Environ. Res. Public Health* 2018, 15, 1557) and environmental well-being, (see, e.g., Jensen, F. B. *Comp. Biochem. Physiol.* A 2003, 135, 9), there is a great need for careful monitoring and control of nitrite and related nutrients, such as nitrate ions ($NO_3^-$) which can be reduced to nitrite ions for detection. These nutrients, specifically nitrate, are introduced in large quantities into the environment and groundwater supplies by poor wastewater management, agricultural fertilizer use, and contaminating industrial processes. While groundwater supplies in the United States are monitored for these contaminants using EPA regulations, many developing nations with unregulated wastewater treatment have extremely high concentrations of nitrate in their drinking water supplies. The ingestion of nitrite, and the endogenous conversion of consumed nitrate to nitrite, can negatively impact human health in a number of ways, including through the transformation of hemoglobin to methemoglobin via a reaction with nitrite, leading to reduced oxygen transport efficiency (methemoglobinemia, also known as baby-blue syndrome) and the formation of carcinogenic N-nitroso-compounds.

Methemoglobin formation via nitrite exposure is also a concern for aquatic organisms, yet at markedly lower ppm concentrations of nitrite since nitrite is directly taken up through the gills of fish and crustaceans. Additionally, for many fish species, nitrite has the ability to replace chloride in essential chloride uptake mechanisms, leading to chloride depletion and general ionic imbalance. Accumulation of nitrite in the extracellular fluid of fish is a major concern, as environmental concentrations of nitrite at the micromolar level can lead to toxic millimolar concentrations in the blood plasma of some aquatic species (E. M. Williams and F. B. Eddy, *Aquat. Toxicol.* 1988, 13, 29). Elevated nitrite and nitrate levels in aquatic systems also lead to excessive overgrowth of plants and algae, termed eutrophication, that leads to low-oxygen environments and the loss of aquatic life. Toxic algal blooms can occur, producing cyanotoxins, or brevetoxin (red tide toxin) that threaten marine and human health. While the aforementioned effects of nitrite and nitrate typically occur at low ppm levels, the maximum contaminant level (MCL) for nitrite in drinking water supplies legislated by the EPA is 1 ppm (21.7 µM) and 10 ppm for nitrate. Therefore, ppb level detection methods are desirable for monitoring nitrite concentrations before they reach potentially dangerous levels.

Nitrite detection at ppb levels can be accomplished in laboratory settings using spectroscopic techniques including fluorescence, chemiluminescence, and electrochemistry (see Wang, Q-A. et al., *Talanta,* 2017, 165, 709). Yet these techniques are not easily translocated for on-site, real-time measurements: they are expensive and require large instrumentation, and they are not easily utilized by citizen scientists. Thus, colorimetric detection methods that are inexpensive, user-friendly, and easily transported are desired for field measurements. Colorimetric nitrite detection schemes typically utilize the "Griess reagents," sulfanilamide (or sulfanilic acid) and N-(1-naphthyl)ethylenediamine (or N-(1-naphthyl)ethylenediamine dihydrochloride, and also known as naphthylethylenediamine or NED), which form a highly visible and colored azo dye in the presence of nitrite (FIG. 1; see also Jayawardane, B. M. et al., *Anal. Chem.,* 2014, 86, 7274.). Although commercially available nitrite detection methods typically rely either on solution-phase or dipstick test strips, several microfluidic devices for nitrite detection have been reported in recent literature (Bhakta, S. A. et al., *Anal. Chim. Acta,* 2014, 809, 117.). Paper-based devices benefit from low-cost and portability and require minimal sample volumes and user input. The ability to create well-defined hydrophobic barriers allows for precise control over capillary-action mediated fluid transport. While the reported devices have allowed for nitrite detection limits as low as 46 ppb (supra Jayawardane et al.), they are limited by poor device stability, with the Griess reagents degrading on the order of several days. Accordingly, there remains a need for an easy-to-use device equipped with longer lasting nitrite-detection agents for sensitive and reliable on-site, real-time detection.

SUMMARY OF THE INVENTION

A promising approach for increasing the sensitivity of these detection methods is the covalent modification of a solid surface with the colorimetric reagents including the Griess reagents. In this way, the colorimetric response of the chromophores to nitrite will be concentrated in one location, allowing for a darker localized coloration that is not transported by the flow of solvent. One such method involves the synthesis of immobilized polymers bearing N-(1-naphthyl) ethylenediamine and sulfanilamide moieties that rapidly detect nitrite with a detection limit of 4 ppm (Kunduru, K. R. et al., *Sens. Actuators B,* 2017, 251, 21). The Griess reagents have also been immobilized onto gold surfaces for SERS-based detection of nitrite (Li, D. et al., *Biosens. Bioelectron.,* 2018, 99, 389), but their attachment has never before been attempted on a cellulose-based substrate.

In one aspect, the invention relates to a method of functionalizing a substrate's solid surface through covalent attachment of an organic compound, preferably, a colorimetric reagent (e.g., a Griess reagent), through a linker. While the substrate may be a variety of materials, a preferred substrate is cellulose or other water-sensitive material because of advantages described in further detail below. The attachment chemistry disclosed by the invention works on a surface with nucleophilic attachment sites such as —OH, —NH$_2$, —SH groups and so on.

According to a preferred embodiment of the invention, epichlorohydrin is used as an exemplary organic linker to affix N-(1-naphthyl)ethylenediamine to cellulose for the detection of nitrite following conditions such as those shown in Scheme 1 (FIG. 2). While various linking molecules have previously been used to affix molecules to cellulose and other surfaces, to our knowledge this has not been reported for the grafting of N-(1-naphthyl)ethylenediamine or any other molecule for nitrite detection. Epichlorohydrin has been reportedly used to graft small molecules and macrocycles to cellulose or to create cross-linked cellulose materials (see, e.g., Udoetok, I. A. et al., *Materials*, 2016, 9, 645). An epichlorohydrin-derived linkage is typically reacted using aqueous sodium hydroxide solution (Du, Z. et al., *Electrochim. Acta*, 2019, 299, 19). However, epichlorohydrin is known to undergo hydrolysis or form other unfavorable side products in these conditions due to the presence of a strongly nucleophilic base and a nucleophilic solvent (see Lu, Y. et al., *Chin. J. Chem. Eng.*, 2017, 25, 301; Yao, Y. et al., *Sci. Rep.*, 2015, 5, 14231). Other linking molecules, including 1,1'-carbonyldiimidazole have been employed to link small molecules to cellulose, yet these often require rigorous air-free conditions (Aloulou, F. et al., *Sep. Purif Technol.*, 2006, 52, 332). Additionally, multi-carboxylic acid linkers are common, yet these require elevated temperatures that are undesirable for temperature-sensitive small molecules (e.g., Castro, D. O. et al., *Mater. Sci. Eng. C*, 2016, 69, 1018).

In contrast, the present invention discloses much different reaction conditions through the use of an inert organic solvent and a non-nucleophilic base in conjunction with an organic linker such as epichlorohydrin to produce superior functionalization ratios compared to the aqueous sodium hydroxide route. The latter route uses such strong base(s) (instead of NaOH, other metal-hydroxide bases such as KOH and LiOH can be used), that the underlying substrate often faces very harsh chemical conditions during the attachment chemistry. The present invention, on the other hand, provides a chemically gentle alternative that obviously offers great advantages for many materials especially water-sensitive substrates as the inventive process does not bring about any hydrolysis that could harm or degrade those substrates.

Accordingly, in one aspect, the present invention discloses a method of functionalizing a substrate surface, wherein the surface comprises nucleophilic attachment sites and the method includes: in an inert organic solvent, causing the surface to contact a nucleophilic, small-molecule reagent in the presence of an organic linker and a non-nucleophilic base. Preferably, the base is in an amount to sufficiently deprotonate both the substrate and the small molecule reagent, as determined by their amounts and stoichiometry, and the linker molecule in an amount necessary to provide statistically desired functionalization density given the available number of substrate attachment sites. In preferred embodiments, the nucleophilic reagent can be a detection reagent, an aromatic amine, e.g., N-(1-naphthyl)ethylenediamine. The substrate can be cellulose. The organic linker can be epichlorohydrin. The inert organic solvent can be acetonitrile. The non-nucleophilic base can be 1,8-diazabicyclo[5.4.0]undec-7-ene (DBU).

In a feature, the reaction is conducted at a temperature no higher than about 60° C., and can further include a step of sonication of the substrate surface prior to functionalization.

In another aspect, the present invention discloses subsequent use of a cellulose surface functionalized according to principles of the invention, e.g., for ultrasensitive nitrite detection. In an embodiment, the disclosure provides a method of detecting nitrite using a cellulose-based device, the method comprising providing, in such device, a detection zone containing a cellulose surface that has been functionalized with N-(1-naphthyl)ethylenediamine, and causing a test sample to contact sulfanilamide and an acid by the time it reaches the detection zone, such that any nitrite in the sample above about 4.0 ppb in concentration reacts with N-(1-naphthyl)ethylenediamine and sulfanilamide, and emits a detectable chromatic signal, i.e., color change resulting from the formation of an azo dye. Detection of the chromatic signal can be achieved using any means known to one skilled in the art, i.e., all apparatuses capable of detecting colorimetric signals, including but not limited to colorimetric readers, spectrographs, spectrometers, and direct visual inspection.

Accordingly, the invention provides a paper-based device for detecting nitrite, comprising a detection surface containing cellulose functionalized with NED and further comprising a path pre-loaded with sulfanilamide and an acid, such that a nitrite-containing sample flowing through the path to the detection surface will emit a detectable chromatic signal. In various embodiments, the device may also include a light source directed at the detection surface, a camera configured to capture any chromatic signal emitted from the detection surface, a colorimetric reader, and/or a microprocessor for processing any detected chromatic signal.

The foregoing and other objects, aspects, features, and advantages of the invention will become more apparent from the following description and from the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 5A-5C show optimized device architecture according to a preferred embodiment of the invention in (A) top view, (B) top view, and (C) expanded view, after treatment with 7.5 ppm nitrite solution.

DETAILED DESCRIPTION OF THE INVENTION

I. Definition

Figure 1:
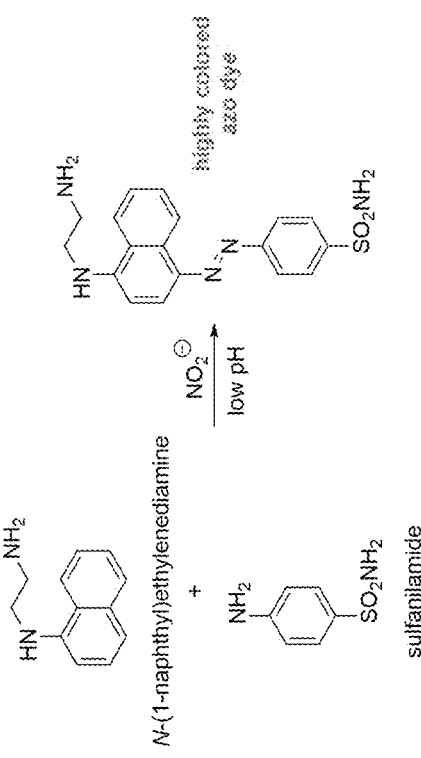
FIG. 1 illustrates a chromogenic reaction through which nitrite can be detected.

Unless otherwise noted, technical terms are used according to conventional usage. Definitions of common terms in molecular biology may be found, for example, in J. Krebs et al. (eds.), *Lewin's Genes XI*, published by Jones and Bartlett Learning, 2017 (ISBN 9781284104493); Robert A. Meyers (ed.), *Molecular Biology and Biotechnology: a Comprehensive Desk Reference*, published by Anmol Publications Pvt. Ltd, 2011 (ISBN 9788126531783); and other similar technical references.

As used in the specification and claims, the singular form "a", "an", or "the" includes plural references unless the context clearly dictates otherwise. For example, the term "a cell" includes a plurality of cells including mixtures thereof. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent," or "except for [a particular feature or element]," or "wherein [a particular feature or element] is not present (included, etc.) . . . ".

When a dimensional measurement is given for a part herein, the value is, unless explicitly stated or clear from the context, meant to describe an average for a necessary portion of the part, i.e., an average for the portion of the part that is needed for the stated purpose. Any accessory or excessive portion is not meant to be included in the calculation of the value.

As used herein, the recitation of a numerical range for a variable is intended to convey that the invention may be practiced with the variable equal to any of the values within that range. Thus, for a variable which is inherently discrete, the variable can be equal to any integer value within the numerical range, including the end-points of the range. Similarly, for a variable which is inherently continuous, the variable can be equal to any real value within the numerical range, including the end-points of the range. As an example, and without limitation, a variable which is described as having values between 0 and 2 can take the values 0, 1 or 2 if the variable is inherently discrete, and can take the values 0.0, 0.1, 0.01, 0.001, or any other real values >0 and <2 if the variable is inherently continuous.

As used herein, "about" means within plus or minus 10%. For example, "about 1" means "0.9 to 1.1", "about 2%" means "1.8% to 2.2%", "about 2% to 3%" means "1.8% to 3.3%", and "about 3% to about 4%" means "2.7% to 4.4%."

As used herein, the term "detection reagent" refers to a reagent capable of, whether by itself or in combination with another reagent, detecting a target analyte, e.g., nitrite ions. Non-limiting examples of detection reagents for nitrite include the "Griess reagents": sulfanilamide (or sulfanilic acid) and N-(1-naphthyl)ethylenediamine (or N-(1-naphthyl)ethylenediamine dihydrochloride).

As used herein, the term "functionalization density" refers to the number of covalently attached detection reagent per unit area of the substrate surface or the density of detection reagent on the substrate.

As used herein, the term "linker" or "spacer" refers to an organic moiety that connects parts of a compound.

As used herein, the term "nucleophilic," sometimes known as "electron-rich," refers to a capacity and often a tendency of the compound that it describes to form, using its electrons, a covalent bond with another compound. The latter compound, which accepts the electrons in the formation of the covalent bond, is referred to as "electrophilic" herein. Non-limiting examples of "nucleophilic" groups include primary amines, secondary amines, tertiary amines, thiols, and hydroxyls. A "nucleophilic" reagent, as used herein, refers to any organic compound with at least one nucleophilic attachment site through a function group such as an —$NH_2$, —OH, —SH group, etc.

As used herein, the term "water-sensitive" refers to being susceptible to hydrolysis.

The present disclosure describes an apparatus for detecting certain analyte in a test sample, in particular, the presence of nitrites or related chemicals such as nitrates, as well as the surface chemistry related thereto. More specifically, the disclosure describes, amongst other things, a detection reagent consisting of a primary amine, more specifically, a nucleophilic aromatic diamine, that is directly and covalently coupled through a linker to a substrate. In advantageous embodiments, the substrate is water-sensitive.

Addressing the surface chemistry first. According to principles of the present invention, a nucleophilic reagent, i.e., a reagent with a nucleophilic group, such as an —$NH_2$, —OH, or —SH functional group, is coupled to a substrate surface under novel conditions through a linker. In a preferred embodiment, such nucleophilic reagent is a detection reagent, e.g., any aromatic molecule containing an —$NH_2$, —OH, or —SH functional group that can be used in the formation of azo dyes, such as 1-naphthol, 1-naphthylamine, aniline, phenol, and their derivatives. In a particular embodiment, the nucleophilic reagent coupled to the substrate surface is an aromatic amine or diamine such as N-(1-naphthyl)ethylenediamine (NED).

The substrate where the coupling chemistry according to the present invention is to be carried on needs to have nucleophilic attachment sites on its surface. Non-limiting examples of such substrates include a variety of materials: cellulose, oxidized glass, polymers such as polyvinyl alcohol (PVA) and polyethylene oxide (PEO), silicon, silicon nitride, oxidized carbon black, glass, and so on.

The linker that is used to attach the reagent to the substrate surface, besides epichlorohydrin, can be any oxirane, aziridine, or thiirane that is bound to a leaving group through one or more methylene spacer, such as epibromohydrin, 2-oxiranemethanol, 2-(phenoxymethyl)oxirane, 2-aziridinecarboxylic acid, or 2-(chloromethyl)thiirane, with any stereochemistry and any substitution that does not interfere with the desired reactivity. Other cross-linking agents such as 2-bromoisobutyryl bromide can also be used for purpose of the present invention.

The coupling reaction generally takes place in steps as follows (FIG. 2): (i) optional pretreatment, e.g., sonication, of substrate in an inert organic solvent (e.g., acetonitrile) for a relatively short period of time, e.g., 30 minutes at room temperature; (ii) add substrate, preferably pretreated as in (i), reagent to be attached, and a non-nucleophilic base to an inert organic solvent (e.g., acetonitrile) for a relatively short period of time, e.g., 30 minutes, preferably at a slightly elevated temperature (e.g., about 50-55° C.), either separately or together; and (iii) add further the linker molecule (e.g., epichlorohydrin) to the above solution and stir or otherwise let mix for an extended period of time, e.g., 3 days, at a slightly elevated temperature (e.g., about 50-55° C.). These steps can be rearranged and modified, e.g., to account for substrate differences. For example, sonication can be left out or replaced with gentle stirring or shaking; substrates and various components of the reaction can be added separately or simultaneously. The entire reaction can be conducted under an inert gas atmosphere if needed.

In terms of temperatures for the various steps in the reaction: this reaction can occur at any temperature as long as it does not lead to substrate degradation. In a preferred embodiment, the reaction is conducted at a temperature no higher than about 60° C.

For the inert organic solvent, besides acetonitrile, non-limiting alternatives include other non-nucleophilic, organic solvent, e.g., dichloromethane, hexanes, ethyl acetate and so on.

For the non-nucleophilic base in step (ii), non-limiting examples include: 1,8-diazabicyclo[5.4.0]undec-7-ene (DBU), 1,5-diazabicyclo[4.3.0]non-5-ene, N,N-diisopropylethylamine, or phosphazene bases. Alternatively, any nucleophilic base that is used up before the addition of the linker solution (e.g., epichlorohydrin), such as triethylamine, or sodium methoxide, can also be used instead.

As a result of the above-disclosed reaction, the nucleophilic reagent is directly and covalently coupled to the substrate surface, therefore functionalizing the surface for further reaction. In the case where the nucleophilic reagent is a detection reagent such as NED, the NED-functionalized substrate surface, when contacted by a test sample containing nitrite ions in the presence of sulfanilamide (or sulfanilic acid) with an acid, the azo dye forms as is well known in the art and not described in further detail here. A similar process of azo dye formation via the Griess reagents is described in detail in U.S. Application Publication 2010/0290948 by Song, the entire disclosure of which is incorporated herein by reference. The formation of the azo dye enables chromatic detection, in various test samples, of nitrite ions, and/or nitrate ions having been reduced to nitrite.

Figure 4:
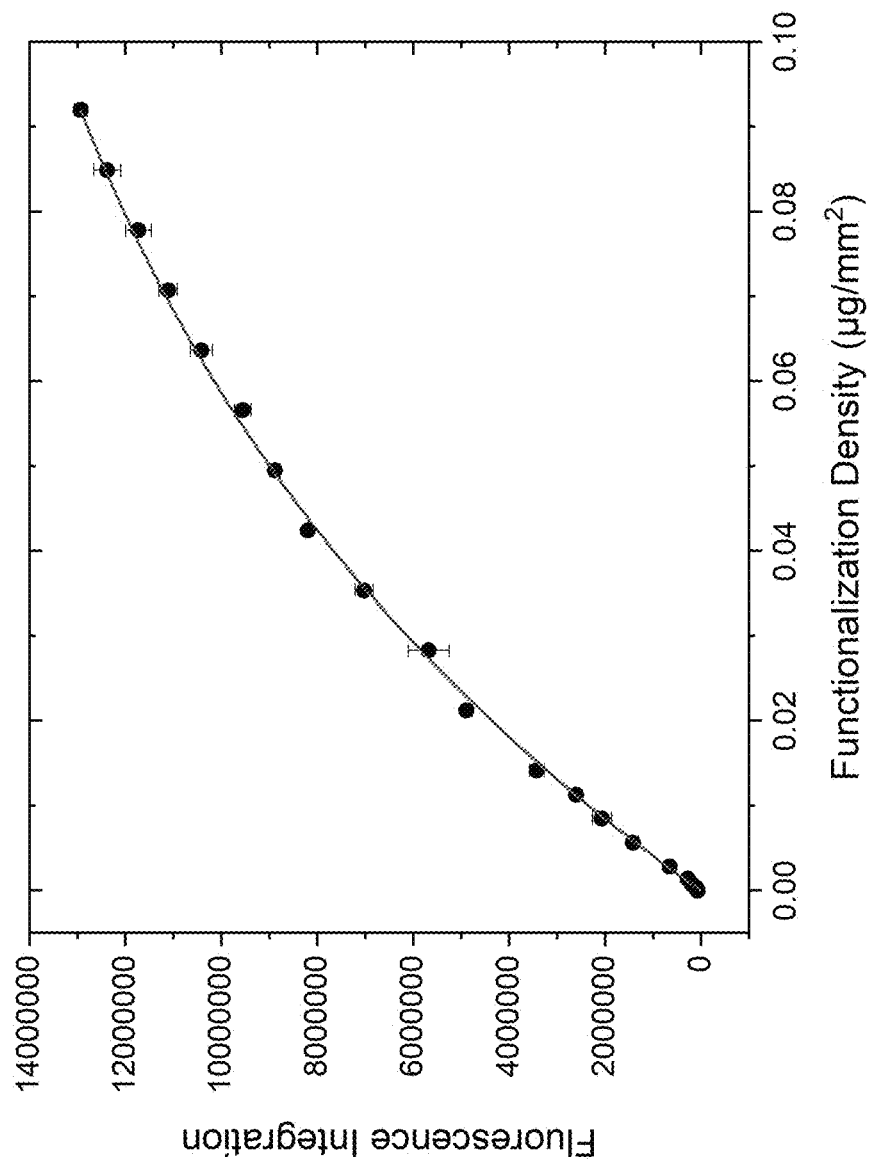
FIG. 4 shows a fluorescence calibration curve for the determination of functionalization degree of a cellulose embodiment functionalized according to principles of the invention. A logistic non-linear curve model (red line) with an equation of: $Y = A^{(-x/t)} + y_0$ was fit to the data where A: $-1.778 \times 10^7$ ($\pm 8.314 \times 10^5$); t: 0.07176 ($\pm 0.00495$); $y_0$: $1.790 \times 10^7$ ($\pm 8.351 \times 10^5$); and $R^2 = 0.9984$.

There are several observed advantages from the surface attachment chemistry disclosed by the present invention. First, it provides improved control over functionalization density (demonstrated higher density in a direct comparison as described below in connection with FIG. 4). Second, the reactions conditions are much milder than conventional ones where harsh chemicals such as NaOH are used, thereby broadening the scope of materials that could be functionalized. Third, water-sensitive substrates such as many paper and textile products can now be functionalized through this process as only organic chemical components are used as opposed to previously reported aqueous or aqueous-organic mixes in epichlorohydrin-attachment methods. This allows for a wider range of applicability of surface attachment chemistry using epichlorohydrin to encompass water-sensitive substrates, and negates side reactions that otherwise would take place between epichlorohydrin and water or strong, nucleophilic bases.

Materials that can be functionalized according to principles of the invention include and are not limited to: paper; polymers with tunable —$NH_2$, —OH, —SH, or similar termination; silicon, silicon nitride and related materials; and glass. The gentle conditions are critical for most paper-based devices, as well as for polymers. For glass, the present invention offers an alternative to conventional, atmosphere-sensitive silane chemistry.

Non-limiting examples of the wide applicability of the functionalized materials resulting from the inventive process include: paper-based test-strips, e.g. for medical and environmental testing; glass, plastic, Si-containing microarrays for, e.g., biomedical testing such as platforms for ELISA, and biomedical testing writ large (home pregnancy testing, glucose testing, etc.); textiles with covalently linked dyes, reducing the environmental footprint of conventional dyeing; and textiles, polymers, etc. with tunable mechanical properties.

Functionalization of Cellulose

In an embodiment of the present invention, acetonitrile was found to be the preferred organic solvent for functionalization of cellulose with N-(1-naphthyl)ethylenediamine as acetonitrile did not react with epichlorohydrin, whereas nucleophilic solvents including water, alcohols, and DMF did. While slightly elevated temperatures (50-55° C., both ends inclusive) provided superior degrees of functionalization compared to room temperature conditions, temperatures higher than 60° C. led to degradation of the functionalized product. Additionally, wax barriers were optionally pre-printed onto the paper to be functionalized. While minimal wax loss was seen with mild heating (e.g., at about 50° C.), substantial wax loss was caused by higher temperatures. Several non-nucleophilic bases were examined, and 1,8-diazabicyclo[5.4.0]undec-7-ene (DBU) was found to best promote reactivity while remaining unreactive to undesired side reactions with epichlorohydrin.

In an exemplary embodiment (FIG. 2), to a 0.017 M solution of N-(1-naphthyl)ethylenediamine in acetonitrile, 3.0 molar equivalent of DBU was added and the solution was stirred at 50 or 55° C. for 30 minutes. Then, 1.20 weight-equivalent of cellulose-based paper, e.g., Whatman #602h, was added and the sample was stirred at 55° C. for another 30 minutes. Further, 3.3 molar equivalent of epichlorohydrin was added and the solution was stirred at 55° C. for 3 days. Upon cooling the reaction to room temperature, the supernatant was decanted, and the paper was washed twice with acetonitrile, once with DI water, thrice with 1.0 M HCl, and thrice more with DI water before being collected and allowed to dry: first over vacuum, then in a 50° C. oven for 30 minutes. Types of paper successfully modified according to this embodiment of the invention included Whatman #1, Whatman #4, and Whatman #602h. A variety of shapes and sizes of paper have been modified according to this method, so was paper with wax printed barriers.

Figure 2:
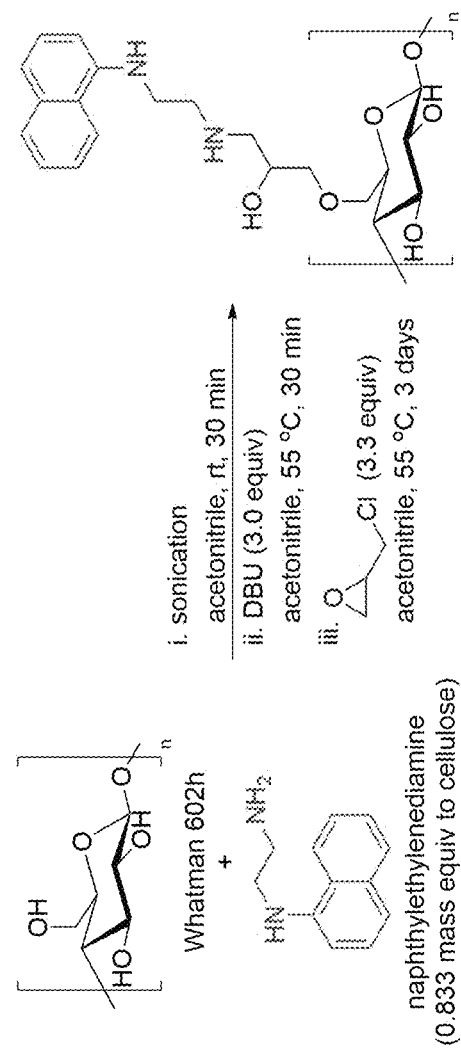
FIG. 2 illustrates the chemical scheme for a preferred method of functionalizing a substrate such as cellulose, according to an embodiment of the invention.

One advantage of the invention is that the stability of N-(1-naphthyl)ethylenediamine increased upon its grafting to cellulose because the readily oxidized primary amine is transformed into a much more stable secondary amine (FIG. 2). Internal fluorescence studies (data not shown) indicate that there was minimal change in fluorescence over a 110-day period where the functionalized paper was stored in a capped clear vial under ambient temperature and lighting conditions. If N-(1-naphthyl)ethylenediamine degradation or oxidation had occurred, this would have been evident by a decrease in fluorescence. Additionally, over this time period, the paper remained white, which strongly suggests that the N-(1-naphthyl)ethylenediamine-functionalized paper is minimally sensitive to air, moisture, or light.

Figure 3:
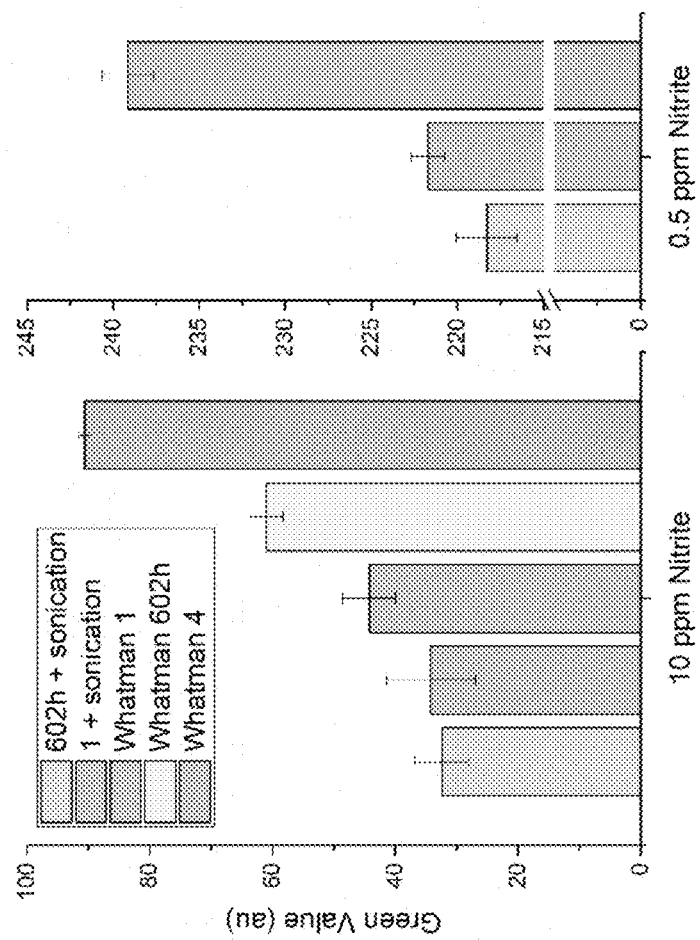
FIGS. 3A and 3B compares data varied by paper type and sonication conditions of cellulose substrates that were functionalized according to principles of the invention and then tested with: (A) 10 ppm nitrite and (B) 0.5 ppm nitrite, respectively.

In an embodiment, ultrasonication or sonication during solid-state functionalization was implemented successfully as a pre-functionalization step, as shown in FIG. 2, to improve the degree of functionalization, likely by minimally degrading the cellulose to provide more active sites for grafting. Upon comparing several paper types with and without sonication conditions, shown in FIGS. 3A and 3B, sonication conditions provided the best results by measure of fluorescence and colorimetry. At high nitrite concentrations (10 ppm, FIG. 3A) there were little differences between sonicated Whatman #1 (green bar) and sonicated Whatman #602h (orange bar); however, at low concentrations (0.5 ppm), Whatman #602h that underwent sonication provided superior colorimetric output as can be seen in FIG. 3B.

These optimization studies culminated in the conditions shown as the preferred embodiment of the invention in FIG. 2. The degree of functionalization was compared both colorimetrically using ImageJ, an open source image processing software, to analyze the color formed from the reaction with sulfanilamide and nitrite in acidic conditions, and by solid-state fluorescence. By creating and applying a fluorescence calibration curve for functionalization efficiency (FIG. 4), the functionalization density when using the conventional aqueous sodium hydroxide route was calculated to be 6.93 (±2.8) ng/mm$^2$. Substantial improvement of the functionalization efficiency was found upon conducting an analogous reaction using acetonitrile and DBU according to the principles of the invention: the functionalization density was increased 4.8-fold to 33.3 (±1.5) ng/mm$^2$. Further optimizations improved the functionalization density to 65.0 (±4.7) ng/mm$^2$ and the use of sonication increased this to 89.1 (±7.6) ng/mm$^2$, 12.9 times higher than the aqueous sodium hydroxide conditions.

Device Architecture

Now turning to another aspect of the invention showing application in analyte detection, a paper-based device was built with the above-described cellulose surface functionalized with N-(1-naphthyl)ethylenediamine as an area for detecting a target analyte, e.g., nitrite ions. In an exemplary embodiment (FIGS. 5A and 5B), a device according to principles of the present invention includes a detection zone 10 that includes a cellulose bridge 12 having been functionalized with N-(1-naphthyl)ethylenediamine according to the invention, and optionally equipped further with a sample loading zone 14, a sulfanilamide loading zone 16 (also known as the mixing zone for sulfanilamide and nitrite) and/or a wicking zone 18 to promote analyte flow and evaporation. The device utilizing a substrate surface functionalized according to principles of the invention can be in many forms, such as a microfluidic device, a test strip, a dipstick, or test or diagnostic kit, and so on.

In particular and now referring to FIG. 5C, cellulose functionalized according to the invention was affixed to a testing device 20, e.g., one that is paper-based, and used as a test or diagnostic kit for detecting chemical agent(s) such as nitrite ions. In one example, a paper-based device 20 was printed using a wax printer onto white Whatman #1 paper 23, and hydrophobic wax barriers 25 were set on the paper by melting in an oven at 120° C. for two minutes. A piece of the modified paper having been functionalized with NED according to the invention was then affixed to the device 20 using adhesive, e.g., a double-sided tape, as bridge 12 optionally bordered by stripes of wax-printed barriers. Other reagents, sulfanilamide and an acid, e.g., citric, phosphoric sulfuric, hydrochloric acid or a compatible mineral acid, were added as a solution to the sulfanilamide loading zone 16 just before the modified paper was affixed and allowed to dry for 30 minutes. Optionally, a laminate backing sheet 22 and a transparent top laminate sheet 24 with cutouts defining the sample-loading zone 14 and wicking zone 18 are affixed to the device sheet 20. Once all reagents were dry, about 50-75 μL of nitrite solution (in samples ranging from 0 to 100 ppm) were added and allowed to flow through the device. The device was then allowed to dry and an image of the device was collected using an EPSON flatbed scanner. The image was then analyzed for RGB values using ImageJ.

In testing the exemplary embodiment depicted in FIGS. 5A-C, a paper-based device was designed for a 50 μL sample volume with a sulfanilamide/nitrite mixing zone 16 prior to the detection zone 10 where the functionalized paper was located. A fan-shaped wicking zone 18 was chosen to promote sustained liquid flow through the device without requiring an absorbent pad. Optimization studies included varying the amount of sulfanilamide (1.0, 2.5, 5.0, 7.5, or 10.0 μL of an 8.6 mg/mL solution in 1.0 M phosphoric acid); the location of the detection zone and location of the sulfanilamide deposition in relation to the detection zone; the width of lane in relation to width of the device channel; and identity of the acid medium (citric, phosphoric, and sulfuric). And the fully optimized device is shown in FIGS. 5A-C. Self-adhesive, no-heat laminate was used to avoid the application of heat and concomitant degradation of the sulfanilamide, and lamination of the device was found to increase coloration consistency of the detection zone. Adhering the detection zone 10 to the underside of the device 20 also provided more consistent coloration compared to adhering it to the topside. A 3 mm "lip" at the beginning of the detection zone was used as a white background which led to more favorable color analysis, and coloration was analyzed only in a "color analysis section" 26 of the detection zone 10 above the white background as indicated in FIG. 5B.

In a further embodiment, the invention provides a mobile device-based color analysis system using paper functionalized according to methods disclosed herein. In an example, a detection strip (e.g., the paper-based device described above) having a nitrite-detection area based on paper functionalized with N-(1-naphthyl)ethylenediamine using the method of the invention, is connected to a colorimetric reader that is digitally connected or electronically connected to a mobile display or telephone, and through a microprocessor for processing the detected signals so that real-time reading on the display or telephone is achieved.

Detection and Quantitation Limits

Figure 6:
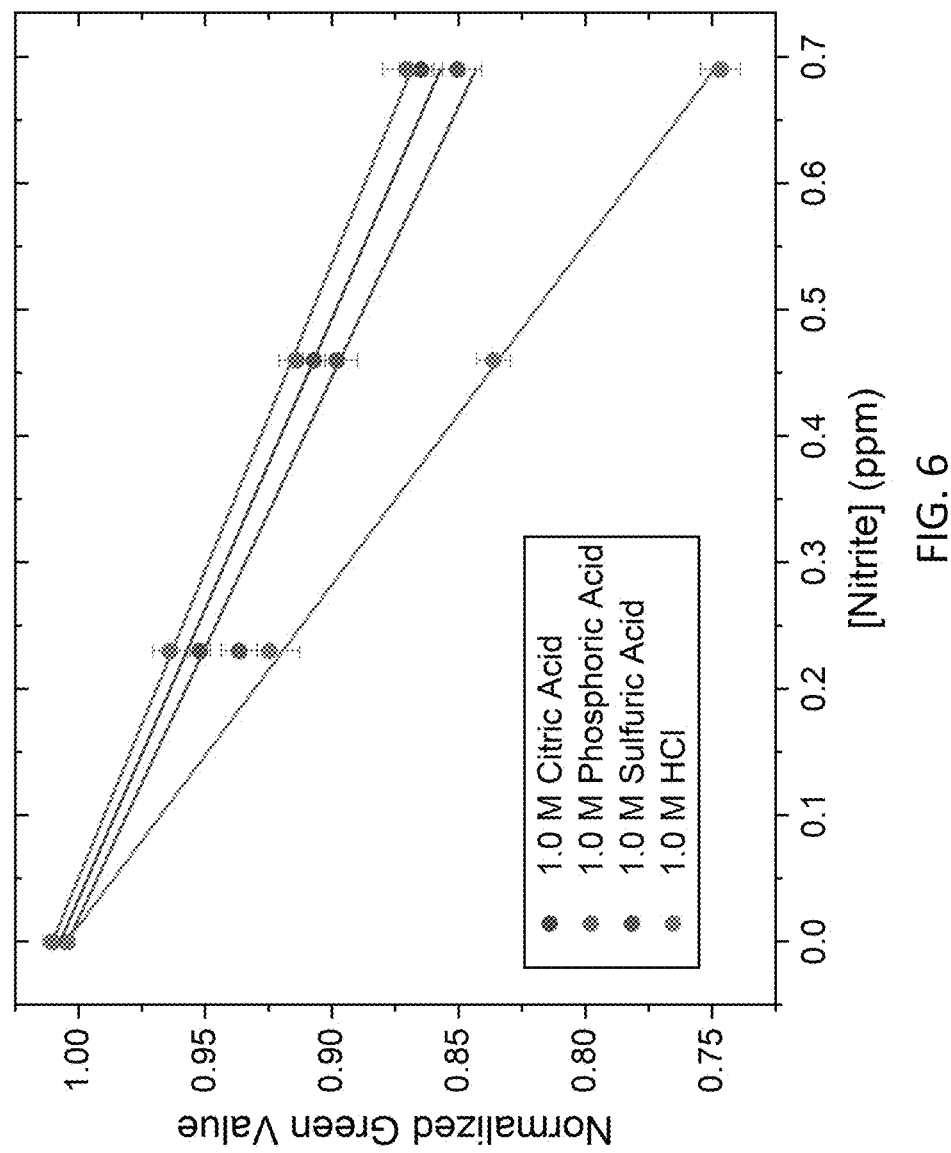
FIG. 6 shows data comparison of hydrochloric, phosphoric, sulfuric, and citric acid conditions in functionalizing substrates according to embodiments of the invention. The nitrite concentrations in the side-by-side comparisons were between 0 and 1.0 ppm.

Limits of detection for the exemplary device were determined in ultrapure water, synthetic seawater, synthetic freshwater, and a real-water sample from the Sargasso Sea. Initially, detection limits of nitrite with the functionalized paper were calculated in ultrapure water using citric acid, phosphoric acid, and sulfuric acid acidic media in which the sulfanilamide is dissolved and deposited. FIG. 6 shows a comparison of nitrite detection from 0 to 0.7 ppm (15 μM), and it can be seen that changing the identity of the acid has a profound effect on detection ability, with hydrochloric acid allowing for the most pronounced change between 0 and 1.0 ppm. Additionally, it was found that the colorimetric response of the sulfuric acid conditions saturated at about 5.0 ppm, lower than that of citric acid and phosphoric acid, which saturate at 10 ppm and 15 ppm, respectively. Detection limits were found using Origin to apply non-linear curve fittings in the 0 to 5.0 ppm range for all calibration curves, with detection limits for citric acid, phosphoric acid, sulfuric acid, and hydrochloric acid conditions at 38.6 ppb, 48.3 ppb, 19.3 ppb, and 4.0 ppb, respectively. Hydrochloric acid and sulfuric acid conditions were superior to phosphoric acid and citric acid, and the differentiation between the two stronger acids was further evident in the limits of quantitation, which were found to be 13.3 ppb for hydrochloric acid and 35.4 ppb for sulfuric acid.

Between the range of 0 to 5.0 ppm, the detection and quantitation limits for nitrite in synthetic seawater were found to be 6.9 ppb and 23.9 ppb, respectively. A synthetic freshwater sample provided a similarly sensitive detection, with a detection limit of 5.5 ppb and a quantitation limit of 19.3 ppb. Detection and quantitation limits in a real-world seawater sample from the Sargasso Sea were 2.3 ppb and 9.1 ppb, respectively. This data suggests that the presence of other ions in solution does not markedly interfere with the detection limits of the inventive system, though separate calibration curves were found to be necessary for saltwater and freshwater systems. These detection and quantitation limits are lower than all previous reports of solid-state detection schemes for nitrite, indicating superior sensitivity of the inventive system.

EXAMPLES

All chemicals and paper were purchased through Fisher Scientific or Millipore Sigma and used as received. All colorimetric and fluorimetric experiments were done in triplicate to ensure the precision of the measurements and the repeatability of the functionalization techniques. Colorimetric measurements were conducted by obtaining digital images using an EPSON V19 Perfection flat-bed scanner and RGB analysis of the detection zone was done using ImageJ software. All colorimetry measurements are reported in Green Value as this was the RGB value that changed most when analyzing the colorimetric experiments, with lower Green Values indicating more intense red coloration. The fluorescence studies were conducted using a Bio Tek Instruments Synergy H1 microplate reader with the following parameters: excitation: 300 nm, emission: 340 to 575 nm, gain: 45; data interval: 1 nm, read height: 10.68 mm. Fluorescence integrations were performed using OriginPro 2018. The paper-based devices were designed using Adobe Illustrator and printed using a Xerox ColorQube 8580. Fellowes® self-adhesive sheets and FLEXcon® FLEXmount® SELECT™ DF051521 clear 0.5 poly perm adhesive/double faced liner were cut to the desired sizes using a Graphtec CE6000-40 cutting plotter. Synthetic freshwater was made following the EPA standard procedures. Synthetic seawater was prepared using Red Sea Coral Pro Salt mix to a salinity of 30.5 ppt by dissolving 33.4 g of the salt mix in 1 L of ultrapure water. Water from the Sargasso Sea (located in the North Atlantic near Bermuda, a typically low-nutrient environment) was filtered through a 0.2 µm filter to remove organic matter.

Example 1: Functionalization of Cellulose

The paper to be functionalized was patterned using a wax printer to create a 2.5×10 mm hydrophilic lane with 3.75×10 mm hydrophobic barriers on each side. The wax was melted in a 120° C. oven for 2.5 minutes. To an appropriately sized Erlenmeyer flask bearing a 24/40 ground glass joint and a stirbar was added the paper to be functionalized, N-(1-naphthyl)ethylenediamine.HCl (0.833 w/w % to cellulose) and acetonitrile (0.022 M to N-(1-naphthyl)ethylenediamine). This solution was sonicated for 30 minutes, then 1,8-diazabicyclo-[5.4.0]undec-7-ene (3.0 equiv. to N-(1-naphthyl)ethylenediamine) was added and the solution was heated to 55° C. for 30 minutes with gentle stirring at 100 rpm. Epichlorohydrin (3.3 equiv. to N-(1-naphthyl)ethylenediamine) was then added, a condenser was attached to the Erlenmeyer flask, and the solution was heated to 55° C. for three days. After the required time period, the solution was cooled to room temperature. The supernatant was decanted off and the functionalized paper was washed thoroughly with acetonitrile (2×), distilled water (2×), 1.0 M HCl (2×, 5 min each), and distilled water (4×). The functionalized paper was collected on a Buchner funnel and vacuum was pulled through for 30 minutes until dry. The paper was further dried in an oven at 50° C. for 30 minutes, then stored in a capped vial away from direct light.

Example 2: Device Fabrication and Application

Devices were patterned using a wax printer, then melted in a 120° C. oven for 2.5 minutes. Self-adhering no-heat laminate was cut using a Graphtec vinyl cutter to desired dimensions. The no-heat laminate was placed on the front of the device, then the device was flipped over and 5 µL sulfanilamide solution (8.6 mg sulfanilamide per 1.0 mL of 1.0 M sulfuric acid) was added at the location 16 indicated on the device shown in FIG. 5A. The solution was allowed to dry for 30 minutes, then the functionalized paper was adhered using double-sided tape to the underside of the device (see FIG. 5C for clarification). An uncut piece of self-adhering no-heat laminate was added to the underside of the device and the device was sealed using a pressure laminator. To the sample loading zone of the device was added 50 µL of aqueous sample. The device was allowed to develop for 30 minutes, then placed on a flat-bed scanner for image collection. Alternatively, naked-eye detection was achieved within 60 seconds. Device performance was analyzed by examining the colorimetric response of the devices to three different concentrations of nitrite: 0.5, 2.0, and 10.0 ppm, collecting digital images using a flatbed scanner, and then using ImageJ to analyze the RGB values of the colorimetric response. Average and standard deviations of the Green Values (across three measurements) were considered when comparing the devices as well as the general evenness of the coloration of the detection zone.

Example 3: Calibration Curve for Degree of Functionalization

To each of 36 wells of a Bio Tek 96 well plate was added a circular 6 mm piece of Whatman #1. A solution of 8.0 mg N-(1-naphthyl)ethylenediamine-HCl in 1.0 mL ultrapure water was created, then diluted by serial dilution to concentrations of 4.0, 2.0, 1.0, 0.50, 0.25, 0.125, 0.0625, 0.0313, 0.0156, 0.0078, 0.0039 mg/mL. To the first three wells was added 5 µL of the 8.0 mg/mL solution, to the second three wells was added 5 µL of the 4.0 mg/mL solution, etc., until all wells were filled. The solutions were allowed to dry for 2 hours in the dark, then the fluorescence of each well was analyzed using the Bio Tek. The fluorescence integration of each spectrum (fluorescence intensity by wavenumber) was obtained using OriginPro2018, and average and standard deviation values were obtained. OriginPro2018 non-linear curve fitting was applied to the data and a logistic curve fitting was obtained. Values for degree of functionalization were obtained using Excel Solver and the obtained equation.

Example 4: Detection and Quantitation Limits

Solutions of nitrite of the concentrations: 25, 15, 10, 7.5, 5.0, 2.5, 1.0, 0.75, 0.5, 0.25, 0.1, 0.075, 0.050, 0.025, and 0.01 ppm were created by serial dilution from a 666.8 ppm nitrite (1000 ppm sodium nitrite) solution. These were applied to the devices and the coloration of the detection zone were analyzed as normal, and average and standard deviation values were calculated for each set of triplicate measurements. OriginPro 2018 non-linear curve fitting models were applied to the data until the most optimal $R^2$ value was obtained. Excel Solver was used, with the equation obtained from the non-linear curve fitting, to find the concentration of nitrite corresponding to the limit of detection (LOD), using $LOD=AVG_{blank}-3*STD_{blank}$, and the limit of quantitation (LOQ), using $LOQ=AVG_{blank}-10*STD_{blank}$.

While the present invention has been particularly shown and described with reference to the structure and methods disclosed herein and as illustrated in the drawings, it is not confined to the details set forth and this invention is intended to cover any modifications and changes as may come within the scope and spirit of the following claims. All publications and patent literature described herein are incorporated by reference in entirety to the extent permitted by applicable laws and regulation.

What is claimed is:

1. A method of functionalizing a substrate surface, wherein said substrate surface comprises a water-sensitive material having nucleophilic attachment sites and the method comprising: in an inert organic solvent, causing said surface to contact a nucleophilic reagent comprising N-(1-naphthyl)ethylenediamine in the presence of an organic linker and a non-nucleophilic base.

2. The method of claim 1 wherein the substrate surface comprises cellulose.

3. The method of claim 1 wherein the organic linker comprises epichlorohydrin.

4. The method of claim 1 wherein the inert organic solvent comprises acetonitrile.

5. The method of claim 1 wherein the non-nucleophilic base comprises 1,8-diazabicyclo [5.4.0]undec-7-ene (DBU).

6. The method of claim 1 wherein the method is conducted at a temperature no higher than about 60° C.

7. The method of claim 1, further comprising a step of sonication of the substrate surface prior to functionalization.

8. A paper-based device for detecting nitrite, comprising a detection surface containing cellulose covalently coupled to N-(1-naphthyl)ethylenediamine and further comprising a path pre-loaded with sulfanilamide and an acid, such that a nitrite-containing sample flowing through the path to the detection surface will emit a detectable chromatic signal.

9. The device of claim 8, wherein the detection surface is functionalized according to the method of claim 1.

10. The device of claim 8, configured for detecting nitrite concentration as low as about 4.0 ppb.

11. The device of claim 8, further comprising a light source directed at the detection surface.

12. The device of claim 8, further comprising a camera configured to capture any chromatic signal emitted from the detection surface.

13. The device of claim 8, further comprising a microprocessor for processing any detected chromatic signal.

14. The device of claim 8, further comprising a colorimetric reader.

15. A method of detecting nitrite using cellulose, the method comprising providing a detection surface containing cellulose covalently coupled to N-(1-naphthyl)ethylenediamine by contacting said surface, in an inert organic solvent, with a reagent comprising N-(1-naphthyl)ethylenediamine in the presence of an organic linker and a non nucleophilic base, causing a sample to have contacted sulfanilamide and an acid by the time it contacts the detection surface, such that any nitrite in the sample above 4.0 ppb in concentration will react with N-(1-naphthyl)ethylenediamine and sulfanilamide, and emit a detectable chromatic signal.

16. The method of claim 15, wherein the acid is selected form the group consisting of citric acid, phosphoric acid, hydrochloric acid and sulfuric acid.

* * * * *